United States Patent [19]

Kessmar

[11] 4,259,877

[45] Apr. 7, 1981

[54] TRANSMISSION SHIFT CONTROL

[75] Inventor: Leo R. Kessmar, Northwood, Ohio

[73] Assignee: Dana Corporation, Toledo, Ohio

[21] Appl. No.: 58,076

[22] Filed: Jul. 16, 1979

[51] Int. Cl.³ ............................................. G05G 9/14
[52] U.S. Cl. ................................................ 74/473 R
[58] Field of Search .............. 74/473 R, 473 SW, 475, 74/476, 477

[56] References Cited

U.S. PATENT DOCUMENTS

| | | | |
|---|---|---|---|
| 2,547,317 | 4/1951 | Gustafson | 74/473 R |
| 2,694,943 | 11/1954 | Brumbaugh | 74/473 R |
| 2,819,626 | 1/1958 | Stump | 74/473 |
| 3,645,145 | 2/1972 | Galas | 74/473 R |
| 4,104,929 | 8/1978 | Kessmar | 74/473 R |

*Primary Examiner*—Allan D. Herrmann

*Attorney, Agent, or Firm*—Charles R. Schaub

[57] ABSTRACT

A shift mechanism for the gears of a transmission is disclosed having a pivotally mounted member. The pivotally mounted member defines an aperture. A shift lever is rotatably positioned in the aperture of the member. A shaft is positioned in adjacent, spaced apart relationship to the member. A shift finger is pivotally and slideably positioned on the shaft. A first bracket is connected to the shift lever. The first bracket is adapted for drivingly engaging a portion of the shift finger and sliding the shift finger on the shaft, whereby the shift finger is moved to select a different gear. A second bracket is connected to the member. The second bracket is adapted for drivingly engaging a portion of the shift finger on the shaft, whereby the shift finger engages the selected gear.

15 Claims, 4 Drawing Figures

TRANSMISSION SHIFT CONTROL

BACKGROUND OF THE INVENTIONS

The present invention relates generally to multi-speed transmissions and more particularly to shift mechanisms for selectively engaging gears of these transmissions.

The development of manual shift multi-speed transmissions has created the problem of providing a shift mechanism which is capable of effecting all of the required transmission gear shifts while maintaining a relatively simple shift pattern. Shift mechanisms generally include a pivotable shift lever and may include a series of linkages operatively connected with the shift lever and adapted to engage and disengage gears of an associated transmission.

Conventional multi-speed transmissions utilize shift forks to axially drive gears into engagement, with each shift fork capable of engaging two gears. A plurality of shift fork is therefore required in a transmission having more than two speeds. Each shift fork is affixed to an axially slideable shift rod, with all of the shift rods of the transmission being adjacent and parallel. Most shift forks have a lug for driving engagement with the shifting mechanism. When all gears are in a neutral position, the lugs of each shift fork are generally laterally aligned with each other. The shifting mechanism must be capable of selectively engaging each of the shift fork lugs to drive each shift fork.

In some vehicles the driver's or operator's compartment is crowded and the need for a simple shift pattern becomes more pronounced. Heavy duty trucks are a good example of a vehicle having a crowded operator's compartment and the need to shift a multi-speed transmission. The gear shift lever normally used in these heavy duty trucks projects upward from the floor of the driver's compartment between the driver's seat and the engine cover. Shift levers of this type are conventionally pivotable in a forward and backward direction and in a sideways or lateral direction. A lateral pivoting of the shift lever effectuates a selecting of the aligned shift fork of the associated transmission while a forward or backward pivoting drives a selected shift fork backwards or forwards thereby selectively engaging or disengaging the gears associated with the shift fork.

The space problems in the driver's compartment become more evident as the number of gears in the transmission increases. More lateral pivoting of the shift lever is required as more shift forks are used in the transmission. Obstruction of lateral movement of the shift lever by the driver's seat or the engine cover becomes an increased possibility.

In other types of vehicles such as smaller trucks or passenger cars, the transmission is located directly under the driver's compartment. The shift lever may extend from a direct control shift mechanism mounted on the transmission or may extend directly from the shift forks within the transmission. However, in either situation, sideways or lateral pivoting of the shift lever has heretofore been required to select one of a plurality of shift forks within the associated transmission. Seats or other equipment within the driver's compartment may obstruct or interfere with the lateral or side movement of the shift lever.

SUMMARY OF THE INVENTION

According to the invention there is provided a shift mechanism for the gears of a transmission comprising a pivotally mounted member having an aperture located therein. A shift lever is rotatably positioned in the aperture of the member. A shaft is positioned in adjacent, spaced apart relationship to the member. A shift finger is pivotally and slideably positioned on the shaft. A first bracket is connected to the shift lever. The first bracket is adapted for drivingly engaging a portion of the shift finger and sliding the shift finger on the shaft whereby the shift finger is moved to select a different gear. A second bracket is connected to the member. The second bracket is adapted for drivingly engaging a portion of the shift finger to pivot the shift finger on the shaft whereby the shift finger engages the selected gear.

It is an object of the present invention to reduce the lateral shift lever movement required for the operation of a multi-speed transmission.

Other objects and advantages of the invention will become apparent as the invention is described hereinafter in more detail with reference to the accompanying drawings.

DESCRIPTION OF THE PREFERRED EMBODIMENTS

Figure 1:
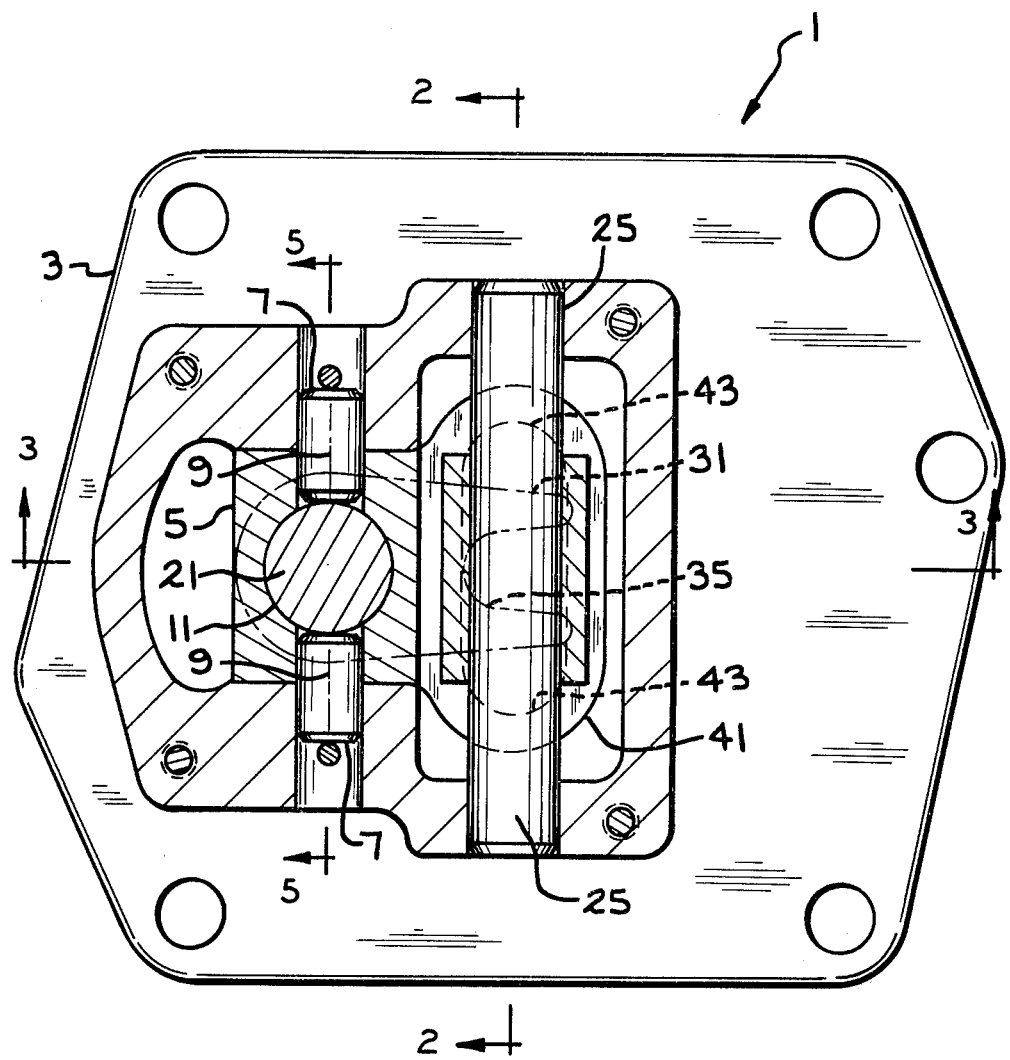
FIG. 1 is a top view of the shift mechanism of the present invention.

This invention related to a shift mechanism that is used to select one of a plurality of gears in a transmission. The shift mechanism of this invention is usually adapted for use with a direct control shifting unit that is mounted directly on a transmission. The features of this invention will be more fully understood by referring to the attached drawings in connection with the following description.

The shift mechanism 1 contains an outer housing 3 which is secured to a transmission 4 by any suitable means, such as bolts (not shown). A member 5 is positioned in the interior of the outer housing 3 in spaced apart relationship with the walls of the outer housing. The member is pivotally mounted on pivot pins 7 that extend from the outer housing 3 into the member 5. The pivot pins have substantially aligned longitudinal axes 9. The member 5 is mounted on the pivot pins so that the member is free to pivot about the longitudinal axes of the pivot pins. There is sufficient space between the walls of the outer housing 3 and the member 5 to allow pivotal movement of the member. The member 5 contains an opening or aperture 11 that passes substantially through the center of the member. The longitudinal axis of the aperture 11 is substantially perpendicular to the longitudinal axes 9 of the pivot pins 7.

The outer housing 3 has one wall 13 that contains an aperture 15. The aperture 15 is substantially in registry with the aperture 11 in the member 5. A portion of the wall 13 around the aperture 15 can be constructed of a generally flexible material.

The shift mechanism also contains a shift lever 21. One end of the shift lever 21 is positioned in the opening or aperture 11 located in the member 5. The shift lever extends from the member and passes through the aperture 15 located in the wall 13 of the outer housing. The other end of the shift lever terminates in a handle (not shown) to facilitate movement of the shift lever. The shift lever 21 is free to rotate in the aperture 11 in member 5 and the aperture 15 in the outer wall 13. The shift lever 21 has a longitudinal axis that is substantially perpendicular to the longitudinal axes 9 of pivot pins 7.

A first bracket 31, having an aperture 33 of substantially the same diameter as the shift lever 21, is positioned on the shift lever with the shift lever passing through the aperture. The first bracket is positioned on the shift lever adjacent to the member 5. The first bracket is secured to the shift lever 21 by welding or any other suitable fastening means. The first bracket extends from the shift lever 21 in a direction that is substantially perpendicular to the longitudinal axis of the shift lever. The portion of the first bracket that extends from the shift lever 21 contains an elongated generally "U" shaped notch or groove 35.

On the end of the member 5, that is opposite the end that is adjacent to the first bracket 31, there is located a second bracket 41. The second bracket extends from the member 5 in a direction that is substantially perpendicular to the longitudinal axis of the shift lever 21. The second bracket contains an elongated aperture 43. The second bracket can be an extension of the member 5 or a separate piece that is suitably secured to the member.

Positioned in adjacent spaced apart relationship to the member 5 is a cylindrical cross shaft 25. The cross shaft 25 is secured to opposite walls of the outer housing 3. The longitudinal axis of the cross shaft is substantially parallel to the longitudinal axis of the pivot pins 7. The longitudinal axis of the cross shaft is also substantially parallel to the long axis of the elongated aperture 43 in the second bracket 41.

A shift finger 27 containing an aperture 29 is positioned on the cross shaft 25. The cross shaft passes through the aperture 29 to support the shift finger. The aperture 29 is of sufficient size so that the shift finger 27 is pivotally and slideably mounted upon the cross shaft 25. The shift finger is in adjacent space apart relationship to the member 5 and the longitudinal axis of the shift finger is substantially parallel to the longitudinal axis of the shift lever 21. The shift finger 27 extends on both sides of the cross shaft 25 in a direction that is substantially parallel to the longitudinal axis of the shaft lever 21.

The first bracket 31 extends from the shift lever 21 in a direction towards the shift finger 27. The notch or groove 35 in the first bracket is designed for drivingly engaging one end of the shift finger 27. Accordingly, the sidewalls of the notch or groove 35 extend around one end of the shift finger 27. The end of the shift finger that is engaged by the notch 35 is substantially cylindrical in shape to facilitate the engagement between the first bracket 31 and the shift finger 27.

The second bracket 41 extends from the member 5 in a direction towards the shift finger 27. The elongated aperture 43 in the second bracket is positioned so that a portion of the shift finger 27 passes through the aperture. The elongated aperture has a width that is adequate to allow movement of the shift finger along the length of the elongated aperture 43. The elongated aperture is also designed for drivingly engaging the shift finger. Usually the portion of the shift finger that is positioned in the elongated aperture will be substantially cylindrical in shape.

The end of the shift finger 27, that is opposite to the end that is engaged by the first bracket 31, is used to engage one of a plurality of gears in a transmission or other gear-changing device. This end of the shift finger comprises an engaging means 48 adapted for drivingly engaging lugs 54, 55 and 56 which are rigidly affixed to the shift forks 51, 52 and 53, respectively of the transmission 4. The arrangement of the plurality of gears and the mode of selecting one of these gears is well known in the art and is not described in detail in this application. For a more detailed explanation of this matter reference can be made to U.S. Pat. No. 4,104,929.

The operation of the shift mechanism of this invention will be more fully understood by referring to the attached drawings in connection with the following description.

For the shift mechanism 1 to properly select one of a plurality of gears in a transmission or other gear-change device, it is necessary for the shift finger 27 to move until the shift finger is aligned with the proper lugs and shift forks in the transmission. Then the shift finger 27 must be moved, in an appropriate manner, to engage and move the shift fork to select the desired gear in the transmission. The shift lever 21 has been provided, in the instant invention, to select the appropriate gear in a transmission or gear-change device.

Figure 2:
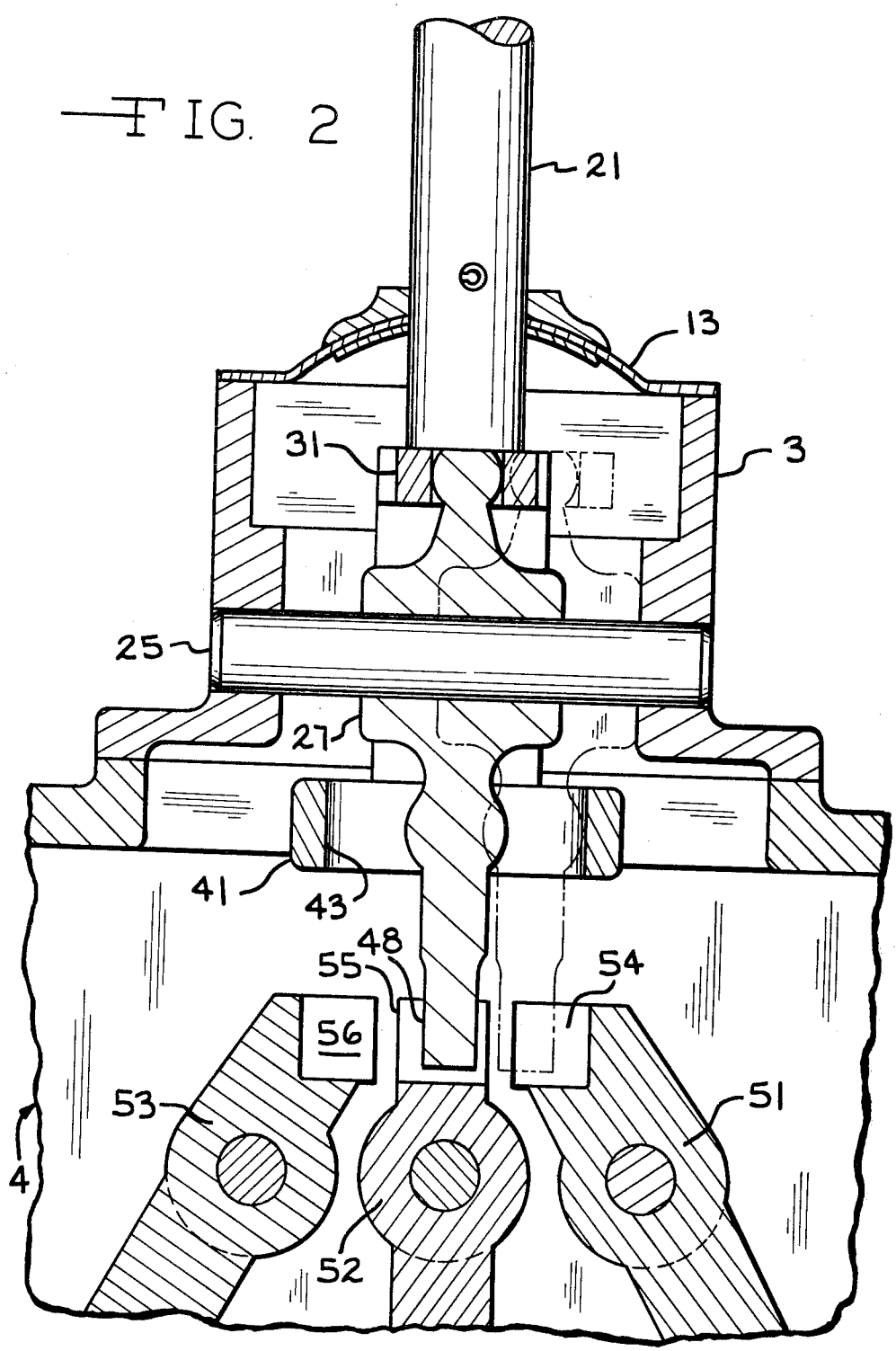
FIG. 2 is a cross-sectional view of the shift mechanism taken along line 2—2 of FIG. 1.

The shift lever 21 is positioned in the outer housing 3 and member 5 so that the shift lever is free to rotate. Rotation of the shift lever 21 causes the first bracket 31 to rotate with the shift lever. The first bracket 31 will move in an arcuate path about the longitudinal axis of the shift lever. As the notch 35 in the first bracket 31 is positioned around one end of the shift finger 27, when the first bracket 31 is caused to rotate the notch 35 will drivingly engage the shift finger. Rotation of the first bracket 31 will cause the shift finger to be laterally or axially displaced along the cross shaft 25. The movement of the shift finger 27, due to the rotation of the first bracket 31, will be in the direction that is substantially parallel to the longitudinal axis of the cross shaft 25. FIGS. 2 (dashed lines) and 4 show the first bracket 31 and shift finger 27 after the shift lever 21 has been caused to rotate. As can be seen from these figures the shift finger has been laterally displaced along the cross shaft 25. The rotation of the shift lever 21 and the first bracket 31 is utilized to move the shift finger along the cross shaft 25. Movement of the shift finger positions the engaging means 48 in alignment with the desired lugs 55,55, and 56 and shift forks 51, 52 and 53 that are connected to the gears in the transmission 4.

Lateral movement of the shift finger 27 will be restricted by the length of the cross shaft 25 and the length of the elongated aperture 43 in the second bracket 41. Usually the length of the elongated aperture 43 will control the limits of lateral movement of the shift finger 27. However, the elongated aperture 43 is constructed to have sufficient length to allow the shift finger to come into alignment with all of the lugs and shift forks of the transmission.

Figure 3:
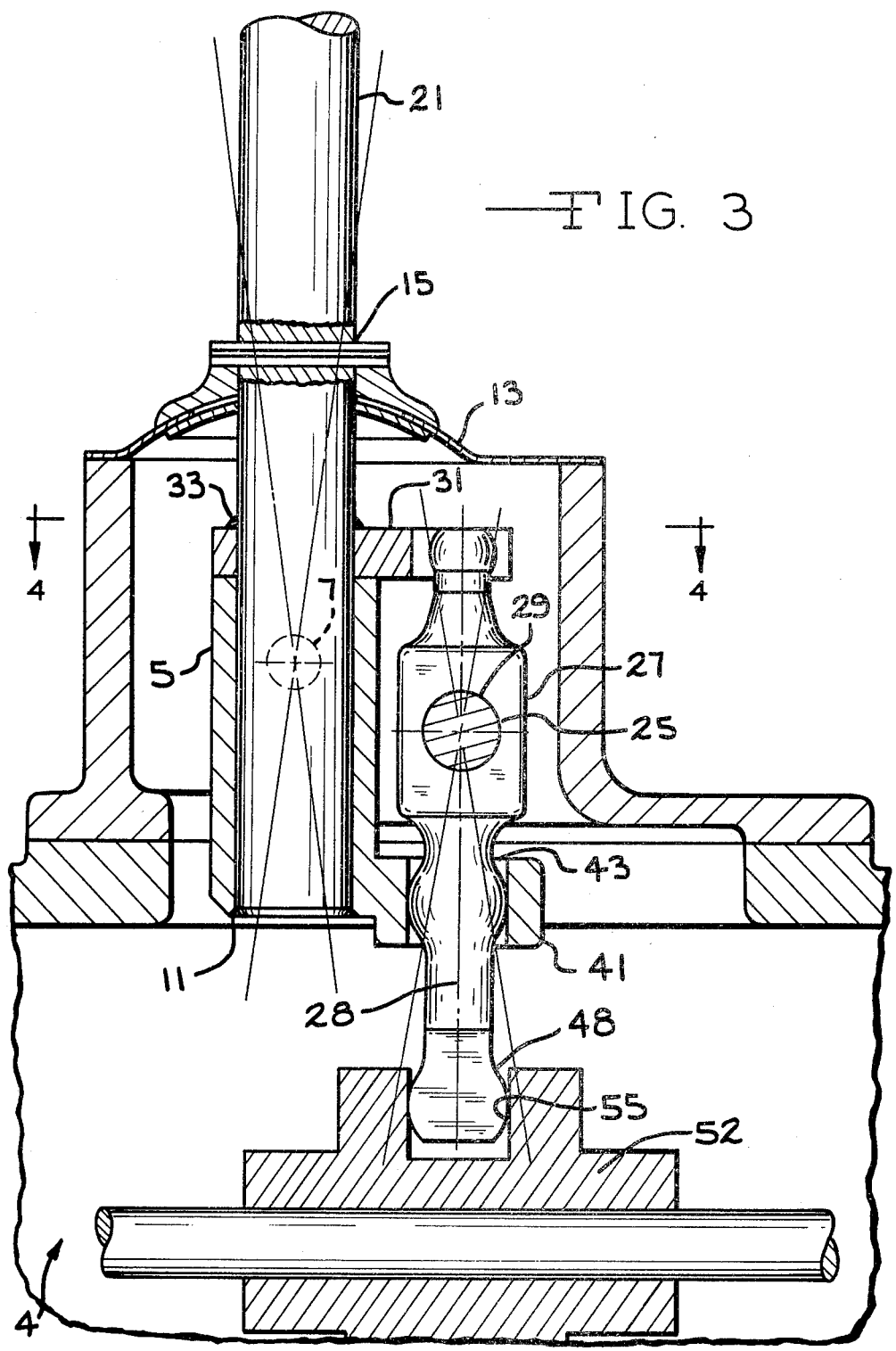
FIG. 3 is a cross-sectional view of the shift mechanism taken along line 3—3 of FIG. 1.
Figure 4:
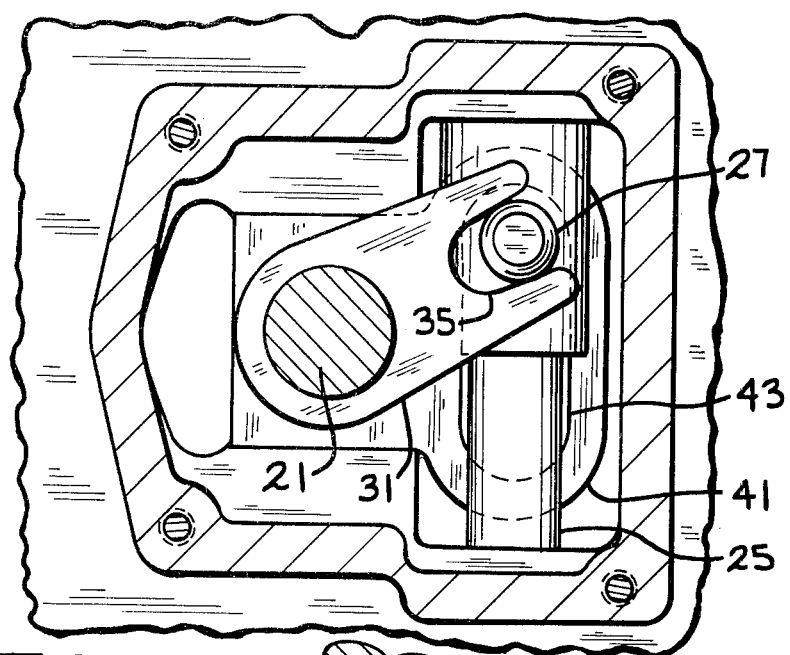
FIG. 4 is a cross-sectional view of the shift mechanism taken along line 4—4 of FIG. 3.
Figure 5:
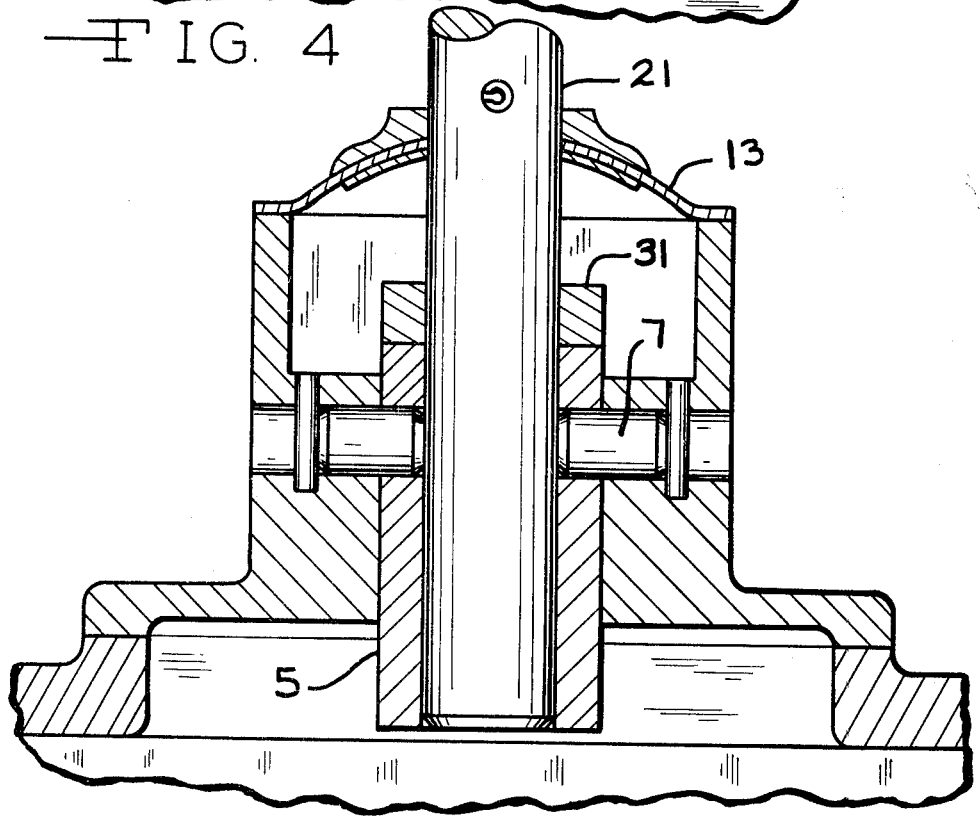
FIG. 5 is a cross-sectional view of the shift mechanism taken along line 5—5 of FIG. 1.

The lateral movement of the shift finger 27, as can best be seen in FIG. 3, is accomplished when the shift finger is not engaging any of the lugs or shift forks in the transmission 4. This is known as the neutral position for the shift finger and in this position the shift finger is free to be moved along the cross shaft 25 by the first bracket 31. The shift finger 27 is held in this neutral position as the shift finger moves along the cross shaft 25 by the elongated aperture 43 in the second bracket 41. The elongated aperture is wide enough to allow the shift finger to move along the cross shaft. However, the elongated aperture is not wide enough to allow the shift finger to pivot on the cross shaft without the second bracket 41 being moved. Thus, the elongated aperture 43 in the second bracket 41 helps to maintain the shift finger in the neutral position while the shift finger is being aligned with the desired shift fork in the transmission.

Once the shift finger has been moved into alignment with the desired lug and shift fork, the lug and shift fork must be moved to engage the selected gear of the transmission. The shift lever 21 is mounted in member 5 and member 5 is pivotly mounted on pivot pins 7. The member 5 can pivot about the longitudinal axes 9 of the pivot pins 7. The shift lever can also pivot about the longitudinal axes of the pivot pin 7. The pivotal movement of the shift lever around the axes 9 of the pivot pins 7 results in a generally fore and aft movement of the shift lever.

Pivotal movement of the shift lever 21 and member 5 will cause the second bracket 41 to pivot or move in a generally fore and aft direction. The movement of the second bracket will be in a direction that is substantially perpendicular to the longitudinal axis of the shift lever 21. A portion of the shift finger 27 passes through, and is drivingly engaged by the elongated aperture 43 in the second bracket. As the second bracket 41 is caused to move by the pivotal or fore and aft movement of the shift lever 21, the elongated aperture 43 will drivingly engage the shift finger 27 and cause the shift finger to move. The shift finger is pivotly mounted on cross shaft 25 and the shift finger will pivot on the cross shaft 25 when drivingly engaged by the elongated aperture 43. The movement of the shift finger will be substantially in the same fore and aft plane in which the shift lever 21 moves. The movement of the shift finger in the fore and aft direction will cause the engaging means 48 of the shift finger to move one of the lugs 54, 55 and 56 and one of the shift forks 51, 52 and 53 to engage a selected gear in the transmission.

Thus, to selectively change gears in the transmission 4, the shift lever is rotated about its longitudinal axis to align the shift finger 27 with the desired lug and shift fork in the transmission. Then the shift lever is moved in a fore and aft direction, around pivot pins 7 to cause the shift finger to move to engage the selected shift fork and gear. To select other gears in the transmission the shift finger 27 is moved along the cross shaft by the rotation of the shift lever 21. When the shift finger is positioned at the desired shift fork, the shift lever is moved in a fore or aft direction to engage the desired gear.

Having described the invention in detail and with reference to the drawings, it will be understood that such specifications are given for the sake of explanation. Various modifications and substitutions other than those cited can be made without departing from the scope of the invention as defined by the following claims.

I claim:

1. A shift mechanism for the shifter forks of a transmission comprising:
    a pivotally mounted member, said member defining an opening;
    a shift lever rotatably positioned in such opening of said member;
    a shaft positioned in adjacent spaced apart relationship to said member;
    a shift finger pivotally and slideably positioned on said shaft, said shift finger being engageable with one of said shifter forks of said transmission;
    a first bracket connected to said shift lever, said first bracket adopted for drivingly engaging said shift finger and sliding said shift finger on said shaft, whereby said shift finger is moved to select a different shifter fork; and
    a second bracket connected to said pivotally mounted member, said bracket adopted for drivingly engaging said shift finger to pivot said shift finger on said shaft, whereby said shift finger engages said selected shifter fork.

2. The shift mechanism of claim 1 wherein said shift finger defines an aperture.

3. The shift mechanism of claim 2 wherein said shaft passes through said aperture in said shift finger.

4. The shift mechanism of claim 1 wherein said member is pivotally mounted on at least one pivot pin.

5. The shift mechanism of claim 4 wherein said longitudinal axis of said pivot pin is substantially parallel to said longitudinal axis of said shaft.

6. The shift mechanism of claim 1 wherein said first bracket defines an aperture and said shift lever passes through said aperture in said first bracket.

7. The shift mechanism of claim 1 wherein said first bracket contains a generally U shaped notch for drivingly engaging said shift finger.

8. The shift mechanism of claim 1 wherein said second bracket defines an elongated aperture.

9. The shift mechanism of claim 8 wherein said shift finger passes through said elongated aperture in said second bracket and said elongated aperture drivingly engages said shift finger.

10. The shift mechanism of claim 8 wherein said longitudinal axis of said elongated aperture is substantially parallel to the longitudinal axis of said shaft.

11. The shift mechanism of claim 9 wherein the width of said elongated aperture is sufficient to allow said shift finger to slide on said shaft.

12. The shift mechanism of claim 11 wherein said width of said elongated aperture is small enough to restrict pivotal movement of said shift finger on said shaft.

13. The shift mechanism of claim 9 wherein said elongated aperture is sufficiently long to allow said shift finger to move into alignment with all of said shift forks in said transmission.

14. A shift mechanism for the shifter forks of a transmission comprising:
    an outer housing;
    at least one pivot pin positioned in said housing;
    a member pivotally mounted on said pivot pin, said member defining an opening;
    a shift lever extending into said housing, one end of said shift lever being rotatably positioned in such opening of said member;
    a shaft positioned in said housing in adjacent spaced apart relationship to said member, said longitudinal axis of said shaft being substantially parallel to said longitudinal axis of said pivot pin;
    a shift finger pivotally and slideably positioned on said shaft, said shift finger defining an aperture through which the shaft passes, said shift finger being engageable with said shifter forks of said transmission;

a first bracket defining an aperture connected to said shift lever, said shift lever passing through said aperture in said first bracket, said first bracket further defining a generally U shaped notch adapted for drivingly engaging said shift finger and sliding said shift finger on said shaft, whereby said shift finger is moved to a different shifter fork;

a second bracket connected to said pivotally mounted member, said second bracket defining an elongated aperture, a portion of said shift finger being positioned in said elongated aperture, said longitudinal axis of said elongated aperture being substantially parallel to said longitudinal axis of said shaft, said elongated aperture adopted for drivingly engaging said shift finger to pivot said shift finger on said shaft, whereby said shift finger engages one of said shift forks.

15. A shift mechanism for the shifter forks of a transmission comprising, in combination;

an outer housing;

a cross shaft mounted in said housing;

a shift finger having upper and lower ends mounted for pivotal and axial movement on said cross shaft, said lower end of said shift finger being engageable with said shifter forks;

a pivotal mounted member positioned in said housing adjacent said shift finger, said member defining an opening;

a shift lever rotatably mounted in such opening in said member;

a first bracket mounted on said shift lever and operatively connected adjacent said upper end of said shift finger for translating said shift finger axially along said cross shaft;

a second bracket mounted on said pivotally mounted member and operatively connected adjacent said lower end of said shift finger for pivotally translating said shift finger.

* * * * *